Oct. 16, 1962 N. W. BELL 3,059,223

ANALOG-TO-DIGITAL CONVERTER

Filed June 21, 1957 2 Sheets-Sheet 1

INVENTOR.
NORTON W. BELL

BY Christie, Parker & Hale
ATTORNEYS.

Oct. 16, 1962 N. W. BELL 3,059,223

ANALOG-TO-DIGITAL CONVERTER

Filed June 21, 1957 2 Sheets-Sheet 2

INVENTOR.
NORTON W. BELL

BY Christie, Parker & Hale
ATTORNEYS

United States Patent Office 3,059,223

Patented Oct. 16, 1962

3,059,223

ANALOG-TO-DIGITAL CONVERTER

Norton W. Bell, Monrovia, Calif., assignor, by mesne assignments, to Consolidated Electrodynamics Corporation, Pasadena, Calif., a corporation of California Filed June 21, 1957, Ser. No. 667,258
4 Claims. (Cl. 340—173)

This invention relates to converters, and more particularly, is concerned with a digitizer for converting an analog voltage signal into coded digital form.

Various systems have heretofore been proposed for converting a voltage level into an equivalent digital representation. The digital representation may be in any coded form, such as binary, binary-coded decimal, etc. Whatever the coded form of the digital output, it changes numerically with each predetermined incremental change of the voltage input.

One type of digitizer for accomplishing this conversion incorporates what is known as the "successive approximation" method of conversion. In this method, an analog feed-back voltage is developed and adjusted by successive approximations until it equals the input voltage. A series of bistable devices, such as relays, on which the digital output is ultimately stored drive a digital-to-analog converter for generating the feed-back voltage. The relays are successively set to one state or the other starting with the relay storing the highest order of bit, until the feed-back voltage is made equal to the input voltage.

The present invention utilizes this approximation method and incorporates an improved circuit using relays throughout. The circuit is characterized by its simplicity and reliability. The circuit of the present invention is particularly suited to the use of mercury-wetted contact relays of the type described in the article "Balanced Polar Mercury Contact Relay," by J. T. L. Brown and C. E. Pollard, Bell System Technical Journal, vol. 32, pages 1303–1413, November 1953. This type of relay has an extremely long contact life but has a very limited number of contacts, presenting special problems in designing circuits using these relays.

The converter utilizing the relay circuit of the present invention uses a scheme in which a feed-back voltage of high stability is adjusted in selected incremental steps of decreasing amplitude until it equals the input analog voltage. The steps are produced by the setting of successive memory relays. The steps are chosen so that a binary-coded decimal representation is established on the memory relays when the feed-back voltage is adjusted to be equal to the input voltage. Thus successive relays introduce voltage steps in the ratio 8, 4, 2, 1, 0.8, 0.4, 0.2, 0.1, 0.08, 0.04, 0.02, and 0.01. The circuit is arranged so that the memory relays are successively operated and as each is operated the comparison is made to see whether the incremental voltage switched into the feed-back exceeds the input voltage. If it does, that memory relay is released and the next memory relay is actuated and another comparison made. Counting relays associated with each of the memory relays keep track of which have already been set.

For a better understanding of the invention reference should be had to the accompanying drawings, wherein.

Figure 1:
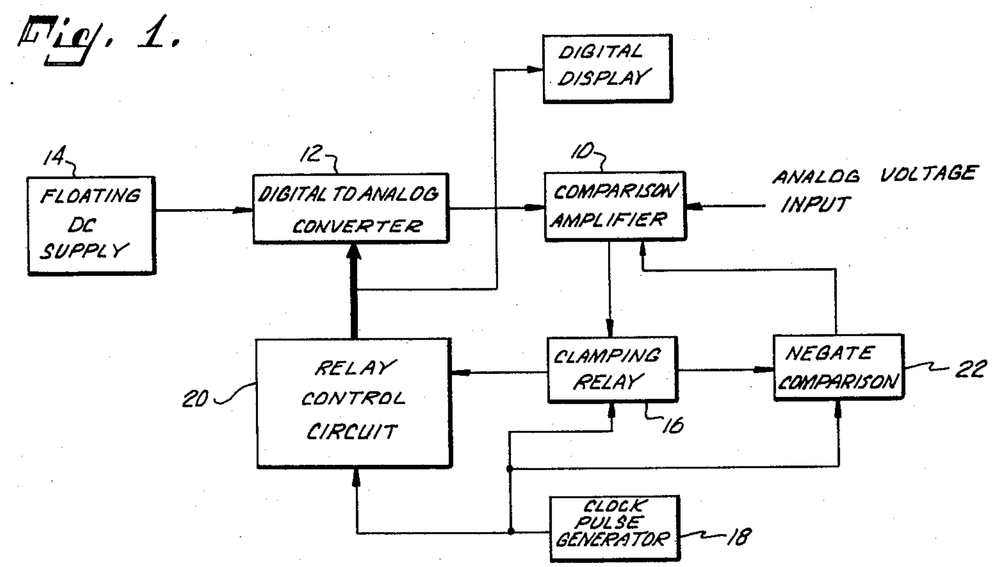
FIG. 1 is a block diagram of the analog-to-digital converter.

Referring to the block diagram of FIG. 1, the numeral 10 indicates generally a comparison amplifier, which may be a conventional differential amplifier. The comparison amplifier receives the analog voltage which is to be measured and compares it with a feed-back voltage derived from a digital-to-analog converter 12. The converter 12 may be of conventional design, such as the converter described in Patent No. 2,738,504, but preferably is of the circuit design shown in FIG. 2 and described in detail in co-pending application Serial No. 667,229, filed June 21, 1957, in the name of the present inventor, now Patent No. 2,892,147. The converter 12 generally comprises an additive voltage divider circuit which divides a fixed voltage derived from a power supply 14 in selected incremental steps of different magnitude by means of which the feed-back voltage may be adjusted in a series of increments of decressing amplitude until it is substantially equal to the input voltage.

A clamping relay circuit 16 is provided on the output of the comparison amplifier 10. The clamping relay 16 is responsive to the polarity of the output of the comparison amplifier, and indicates, when clamped by the output of a clock pulse generator 18, whether or not at that instance the output of the converter 12 is at a higher level or at a lower level than the input analog voltage. The clamping relay circuit is the subject of co-pending application Serial No. 667,259, filed June 21, 1957, in the name of the present inventor.

Clamping relay circuit 16 operates a relay control circuit 20 which includes a plurality of memory relays and a plurality of counting relays connected in a manner hereinafter more fully described in connection with FIG. 4. Successive clock pulses from the generator 18 set the counter section of the relay control circuit 20 while at the same time successive memory relays are set according to the corresponding condition of the clamping relay 16. The memory relays operate the converter 12 such that as each successive memory relay is set, the output of the converter 12 is brought in successive steps closer and closer to equality with the analog input voltage.

A negate comparison circuit 22 is provided which insures, as hereinafter described in detail, that the clamping relay 16 is released after being actuated in response to a change in the output of the converter 12 by an incremental amount so great as to cause the feed-back voltage to exceed the level of the analog input voltage.

Figure 2:
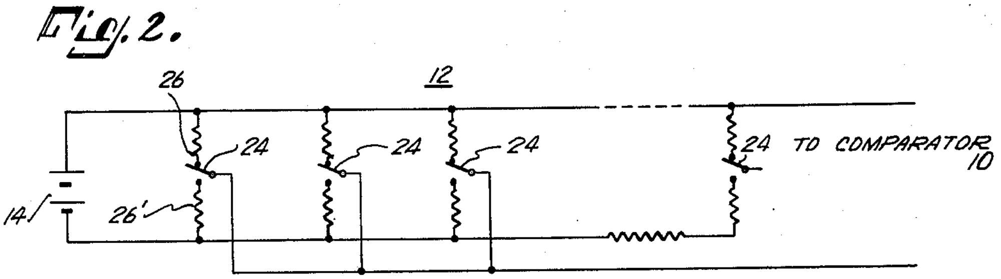
FIG. 2 is a schematic diagram of a suitable additive voltage divider circuit for generating an analog output from a digital input.

While the preferred digital-to-analog converter circuit is described in detail in the above-mentioned co-pending application, a brief review of the converter and its operation is here made for the sake of completeness and a better understanding of the operation of the present invention. Referring to FIG. 2, the converter comprises a plurality of double-pole switches 24; the number of switches depends upon the digital code being used and the number of different digital values to be used. For example, if an analog input voltage ranging from 0 to 16 volts is to be indicated in increments of 0.01 volt using an 8, 4, 2, 1 binary code, twelve such switches are provided in the converter. The converter circuit includes a plurality of pairs of resistors as indicated at 26, 26', the resistors in each pair being equal. The pairs of resistors 26, 26' are connected across the D.C. supply 14. The poles of the switches 24 are connected together to one output of the digital-to-analog converter, the other output being derived from the common junction of the resistors 26.

The circuit of FIG. 2 forms an additive voltage divider, switching any one of the switches 24 providing a predetermined incremental voltage change at the output independently of the condition of any of the other switches in the converter. By properly weighting the value of the resistors in each pair the incremental changes can be arranged to correspond to any code. In the example given above, for instance, when the switch 24 associated with the first pair of resistors on the left is switched to the resistor 26', 8 volts would be produced at the output. The next switch would introduce an increment of 4 volts or the first two switches together would produce an increment of 12 volts. Similarly the next switch would produce an increment of 2 volts, the next switch an increment of 1 volt, the next switch an increment of 0.8 volt, the next an increment of 0.4 volt, the next an increment of 0.2 volt, the next an increment of 0.1, the next switch an increment of 0.08 volt, the next switch an increment of 0.04 volt, the next switch an increment of 0.02 volt, and the next switch an increment of 0.01 volt. Thus by selecting proper ones of the switches 24, the output can be adjusted to any voltage between 0 and 16 volts in increments of 10 millivolts.

The memory and control circuit 20 of the present invention is designed to successively actuate the switches 24 starting with the switch on the left which introduces the largest voltage increment, e.g. 8 volts. A comparison is then made in the comparison amplifier 10 and if the output of the converter 12 does not exceed the analog voltage input, the control circuit 20 operates the next switch to add an additional voltage increment to the output of the converter 12.

If this additional increment should make the output of the converter 12 exceed the analog input voltage, the clamping voltage relay 16 is operated causing the control circuit 20 to release the last actuated switch 24 in the converter 12 and thus by successive steps the output of the converter 12 is adjusted to be substantially equal to the analog voltage input when all the switches 24 in the converter 12 have been set. The setting of these switches 24 then represents the digital equivalent of the analog voltage input.

The basic requirement of the control circuit 20 is that it take the information from the comparison amplifier and actuate the switches in the converter 12 in succession. Since this involves a sequencing operation, the control circuit 20 is synchronized with a clock pulse generator 18. The control circuit 20 includes a series of memory relays, one memory relay being associated with each of the switches 24 in the converter 12. The counting relays, one of which is associated with each memory relay, keep track of which memory relays have already been set.

Figure 3:
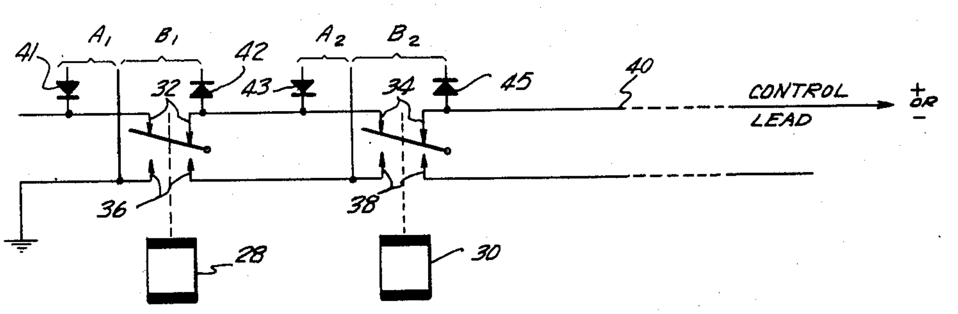
FIG. 3 is a simplified diagrammatic diagram of the relay control circuits.

A simplified circuit diagram of the contact network of the control circuit 20 is shown in FIG. 3. A plurality of counting relays, two of which are indicated at 28 and 30, each operate a pair of normally closed contacts, as indicated at 32 and 34 respectively, and a pair of normally open contacts, as indicated at 36 and 38 respectively. Normally closed contacts 32 and 34 form a series circuit with a control lead 40 on which is applied a positive or negative potential depending on the relative polarity of the output of the comparison amplifier 10. Pairs of diodes are connected to the normally closed contacts, such as 41 and 42, and 43 and 45. The diodes in each pair are oppositely connected, as shown.

With a negative potential applied to the control lead 40, it will be seen that a potential exists at $A_1$ by virtue of the low impedance of the diode 41, and nowhere else. No current can flow to a load connected at $B_1$ because of the diode 42 with a negative potential applied to lead 40. The voltage $A_1$ is used to operate the first memory relay. If the first counter relay 28 is then made to operate in response to the first memory relay, the normally open contacts 36 will be closed and the normally closed contacts 32 will be opened. As a result a potential will now appear at $A_2$ which may be used to operate the next memory relay in response to a negative potential on the control lead 40.

If however a positive potential is applied to the control lead 40 as is the case where the switching of the first memory relay introduces too large a voltage increment to the input of the comparison amplifier 10, a voltage will appear at $B_1$ and nowhere else, which voltage can be used to release the first memory relay. In this manner the successive memory relays can be set in response to a single control lead responsive to a reversible potential from the output of the comparison amplifier 10.

Figure 4:
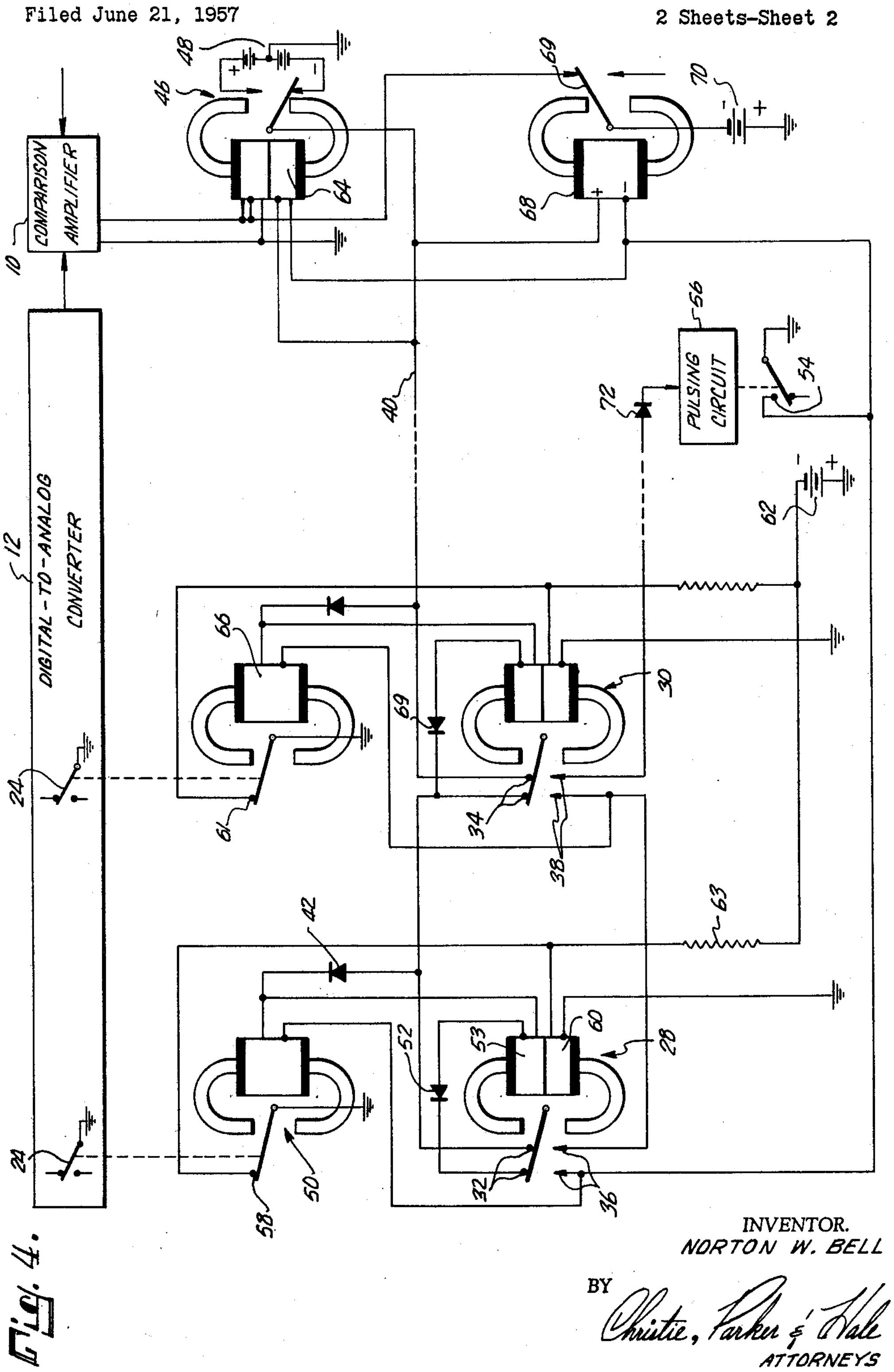
FIG. 4 is a detailed schematic of the relay control circuit.

The relay control circuit is shown in more detail in FIG. 4. The output of the comparison amplifier 10 is applied to a polarized relay 46, constituting part of the clamping relay circuit 16 of FIG. 1. The relay 46 selectively couples the control lead 40 to either a positive or negative potential as provided by battery 48 having a grounded center point. With the analog input voltage having a higher level than the digital-to-analog converter 12, the relay 46 is biased in direction to apply a negative potential to the control lead 40. This potential is applied initially through the series circuit formed by the normally closed contacts of the counting relays, such as indicated at 28 and 30, to the coil of the first memory relay indicated at 50. The circuit is through the control lead 40, through all the normally closed contacts of the relays including the counting relay 28, through a diode 52, one coil 53 on the counting relay 28, through the coil of the polarized memory relay 50 and back to ground through a switch 54 which is actuated by a pulsing circuit 56. The pulsing circuit 56, which together with the switch 54 comprises the clock pulse generator 18 of FIG. 1, is preferably of a type described in the book "The Design of Switching Circuits," by Keister, Ritchie and Washburn, Van Nostrand Co., 1951, page 409, FIG. 18–3C. Every time the pulsing circuit 56 closes the switch 54 the circuit is completed with the control lead 40. Initially this circuit is completed through the first memory relay 50. In actuating the relay 50, a normally closed contact 58 is opened and the first switch 24 in the converter 12 is actuated to produce a first incremental voltage at the output of the converter 12 for application to the comparison amplifier 10.

Opening of the normally closed contact 58 of the first memory relay 50 breaks a shunt circuit across a second control winding 60 of the first counting relay 28. Once the shunting circuit formed by the normally closed contacts 58 is broken, the coil 60 is energized from a potential source 62 through a resistor 63 thereby actuating the first counting relay. It should be noted that the coil 53 on counting relay 28 inhibits the counting relay from operating until the energizing current through the coil 53 is broken by the opening of the switch 54.

When the switch 54 closes, it also completes a circuit from the lead 40 to ground return through a clamping coil 64 on the relay 46 of the clamping relay circuit 16. Thus with the switch 54 closed, a current is passed through the clamping coil 64 from the battery 48, the direction being determined by the polarization of the relay 46. The direction of current is always such as to tend to hold the relay in its existing condition. Thus no change in the comparison relay 46 can take place until the end of the counting cycle when the switch 54 is opened by the action of the pulsing circuit 56.

At this time, depending on the output of the comparison amplifier 10, the relay 46 will remain in the same condition if the incremental change in the output of the converter 12 by operation of the memory relay 50 does not cause the output thereof to exceed the level of the analog input. Otherwise the relay 46 will be operated so as to apply a positive potential to the control lead 40. If the relay 46 remains in its initial condition, i.e. with the negative potential on the control lead 40, the next memory relay, indicated at 66, is operated in the manner as above described when the switch 54 is again closed by the pulsing circuit 56. The relay 66 is energized through a circuit comprising the lead 40, the normally closed contacts of the counting relays including the contacts 34 of the counting relay 30, a diode 69, one coil of the counting relay 30, the coil of the memory relay 66, the now closed switch 54 to ground return.

Thus the second memory relay 66 is energized, opening a pair of normally closed contacts 61 to cause the second counting relay 30 to operate at the end of the counting cycle when the switch 54 again opens.

If at the end of a comparison cycle, as defined by the closing of switch 54 by the pulsing circuit 56, the relay is clamped in a position so as to apply a positive potential to the control lead 40, a current will pass through the first memory relay 50, by virtue of the diode 42, thereby restoring the first memory relay to its original condition.

A negate comparison relay indicated at 68 is then brought into action. This relay has one side connected to ground through the switch 54 and the other side connected to the control lead 40. With negative potential on the control lead 40, when the switch 54 is closed, the relay 68 is operated opening a pair of normally closed contacts 69. However, with a positive potential on the control lead 40, when the switch 54 closes a current passes through the relay 68 in direction such as to operate the relay and again close the contacts 69. By virtue of a battery 70 in series with the normally closed contacts 69, a current is passed through the relay 46 which operates the relay 46 to restore a negative potential on the control lead 40, regardless of the output of the comparison amplifier 10. Thus the relay 68 has the effect of negating a comparison by the comparison relay 46.

By forcing the relay 46 to return to the condition where the lead 40 is negative, the relay circuit is placed in condition to make the next comparison with the next memory relay. While it would normally be expected that when the previous memory relay was released, the output of the converter 12 would return to a level below the level of the analog input and thereby automatically release the relay 46, there is a chance that this would not happen. For example, where the first comparison involved a borderline comparison, as where the output of the converter was only slightly less than the analog voltage, the subsequent comparison after the memory relay was released might find the output of the converter slightly greater than the analog voltage. This may be because the analog input has changed slightly in the interim, or the supply voltage to the converter has drifted slightly. This possibility is obviated by the operation of the negate comparison relay.

With a negative potential reestablished on the control lead 40 by operation of the negate comparison relay 68, operation of the circuit continues as above described with the next memory relay in the series being operated to establish a smaller incremental voltage in the output of the converter 12 and at the same time to operate the next counting relay in the series. This process continues until all the counting relays in the series have been actuated and all the memory relays set (and reset if necessary) as successive comparisons are made. With successive approximations of ever smaller additive incremental voltages produced at the output of the converter 12, the output of the converter 12 is adjusted to be substantially equal to the analog voltage input. At this time the condition of the memory relays provides a digital representation of the value of the analog input voltage.

When the final counting relay is actuated a circuit is completed to ground through the normally open contacts now closed by operation of all the counting relays. Closing of the switch 54, after the last counting relay is actuated, completes a grounding circuit through a diode 72 to the pulsing circuit 56 to stop its action. Another reading may be taken by resetting all the memory relays and counting relays to their initial condition and starting the pulsing circuit again.

What is claimed is:

1. A memory and counting circuit comprising a plurality of pairs of relays, each pair including a polarized memory relay having a control winding for operating or releasing the relay depending on the direction of current pulsed through the control winding, the memory relay having a pair of normally closed contacts, and a polarized counting relay having a control winding, the counting relay having a pair of normally closed contacts and a pair of normally open contacts, a first potential source, means connecting the control winding of the counting relay in each of said pairs of relays across said first potential source, means for connecting the normally closed contacts of the memory relay in each of said pairs of relays respectively to the opposite ends of the control winding of the associated counting relay, first diode means for electrically connecting the control winding of the memory relay between one contact of the normally closed contacts and one contact of the normally open contacts of the associated counting relay, second diode means for electrically connecting the control winding of the memory relay between the other contact of the normally closed contacts and said one contact of the normally open contacts of the associated counting relay, the first and second diode means respectively providing a low impedance to opposite directions of current flow through the control winding of the memory relay, means for connecting the normally open contacts of each of the counting relays in series circuit, means for connecting the normally closed contacts of the counting relays in series circuit, means for periodically applying a potential between said one contact of the normally open contacts of the counting relay of the pairs of relays at one end of said series circuit of normally open contacts and said one contact of the normally closed contacts of the counting relay of the pair of relays at the opposite end of said series of normally closed contacts, and means for reversing the polarity of the potential applied between said series circuits.

2. Apparatus as defined in claim 1 further including a negate comparison polarized relay to which said potential between the series circuits is applied, whereby the negate comparison relay is actuated whenever the polarity of said potential reverses, and means responsive to the negate comparison relay for forcing reversal of the polarity of said potential between the series circuits when the negate comparison relay is operated.

3. A memory and counting circuit comprising a plurality of bistable memory devices having a pair of input terminals and responsive to pulses of opposite polarity applied to the input terminals for setting the memory devices to the respective bistable conditions thereof, switching means including a pair of normally closed contacts and a pair of normally open contacts associated with each of the memory devices, first diode means for electrically connecting the input terminals of each of the bistable memory devices to one contact of the normally closed contacts and one contact of the normally open contacts of the associated normally closed and normally open contact pairs, second diode means for electrically connecting the input terminals of each of the bistable memory devices to the other contact of the normally closed contacts and said one contact of the normally open contacts of the associated normally closed and normally open contact pairs, the first and second diode means respectively providing a low impedance to pulses of opposite polarity, means for connecting the normally open contacts in series circuit, means for connecting the normally closed contacts in series circuit, means for periodically applying a pulse of predetermined polarity between said one contact of the normally open contacts at one end of said series circuit of normally open contacts and said one contact of the normally closed contacts at the opposite end of said series of normally closed contacts, and means for reversing the polarity of the pulses applied between said series circuits.

4. Apparatus as defined in claim 3 further including means for actuating each of the normally closed and normally open contacts in response to the initial reversal of the associated bistable memory device.

References Cited in the file of this patent

UNITED STATES PATENTS

| | | |
|---|---|---|
| 2,754,503 | Forbes | July 10, 1956 |
| 2,762,038 | Lubkin | Sept. 4, 1956 |
| 2,784,396 | Kaiser | Mar. 5, 1957 |
| 2,836,356 | Forrest | May 27, 1958 |
| 2,839,740 | Haanstra | June 17, 1958 |
| 2,839,744 | Slocomb | June 17, 1958 |
| 2,920,316 | Cohen | Jan. 5, 1960 |

FOREIGN PATENTS

| | | |
|---|---|---|
| 157,970 | Australia | Apr. 28, 1952 |

OTHER REFERENCES

"Control Engineering," December 1956, pp. 70–76.